(12) United States Patent
Solomon

(10) Patent No.: US 8,373,540 B2
(45) Date of Patent: Feb. 12, 2013

(54) ANTI-IDENTITY THEFT AND INFORMATION SECURITY SYSTEM PROCESS

(75) Inventor: Stanley B. Solomon, Rolling Hills Estates, CA (US)

(73) Assignee: Worthwhile Products, Rolling Hills Estates, CA (US)

( * ) Notice: Subject to any disclaimer, the term of this patent is extended or adjusted under 35 U.S.C. 154(b) by 0 days.

(21) Appl. No.: 13/364,575

(22) Filed: Feb. 2, 2012

(65) Prior Publication Data

US 2012/0200389 A1 Aug. 9, 2012

Related U.S. Application Data

(60) Provisional application No. 61/439,685, filed on Feb. 4, 2011.

(51) Int. Cl.
*G08B 29/00* (2006.01)
(52) U.S. Cl. ........................................ 340/5.53; 340/5.52
(58) Field of Classification Search .................. 340/5.53, 340/10.1, 5.8, 8.1, 10.51, 5.52; 710/38; 705/72
See application file for complete search history.

(56) References Cited

U.S. PATENT DOCUMENTS

| | | | |
|---|---|---|---|
| 2006/0170530 A1* | 8/2006 | Nwosu et al. | 340/5.53 |
| 2006/0206724 A1 | 9/2006 | Schaufele et al. | |
| 2007/0188342 A1* | 8/2007 | Valeriano et al. | 340/825.49 |
| 2007/0200681 A1* | 8/2007 | Colby | 340/10.51 |
| 2007/0257104 A1* | 11/2007 | Owen et al. | 235/380 |
| 2007/0299783 A1* | 12/2007 | Beenau et al. | 705/72 |
| 2009/0096574 A1* | 4/2009 | Oberle | 340/5.8 |
| 2009/0102606 A1* | 4/2009 | Kim et al. | 340/10.1 |
| 2010/0250812 A1* | 9/2010 | Webb et al. | 710/301 |

\* cited by examiner

*Primary Examiner* — Hai Phan
*Assistant Examiner* — Kaleria Knox
(74) *Attorney, Agent, or Firm* — Lowry Blixseth LLP; Scott M. Lowry

(57) ABSTRACT

The anti-identity theft and information security system process includes storing secure information in association with an electronic device having a communication circuit for sending and receiving data. Biometric information is read with a scanner so that the identity of a user can be authenticating in connection with the supplied biometric information. Once approved, a data communication line is established with a remote device and access to the secure information is unlocked. Thereafter, the secure information may be transmitted between the electronic device and the remote device.

25 Claims, 8 Drawing Sheets

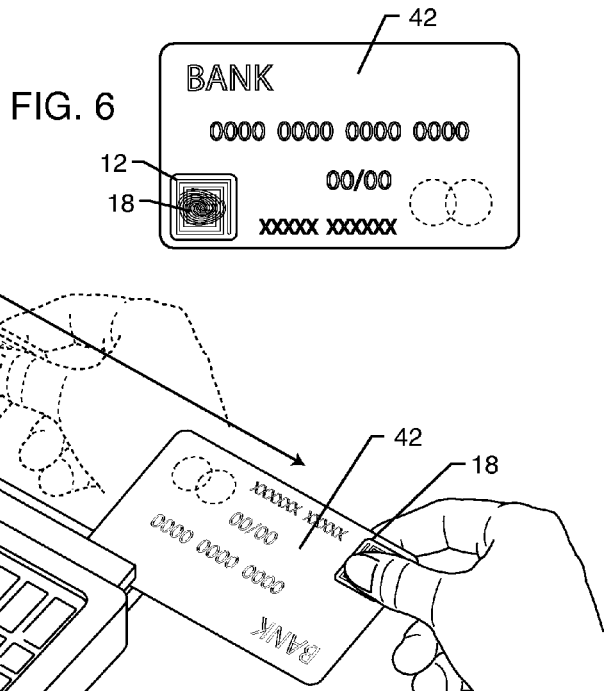
FIG. 6
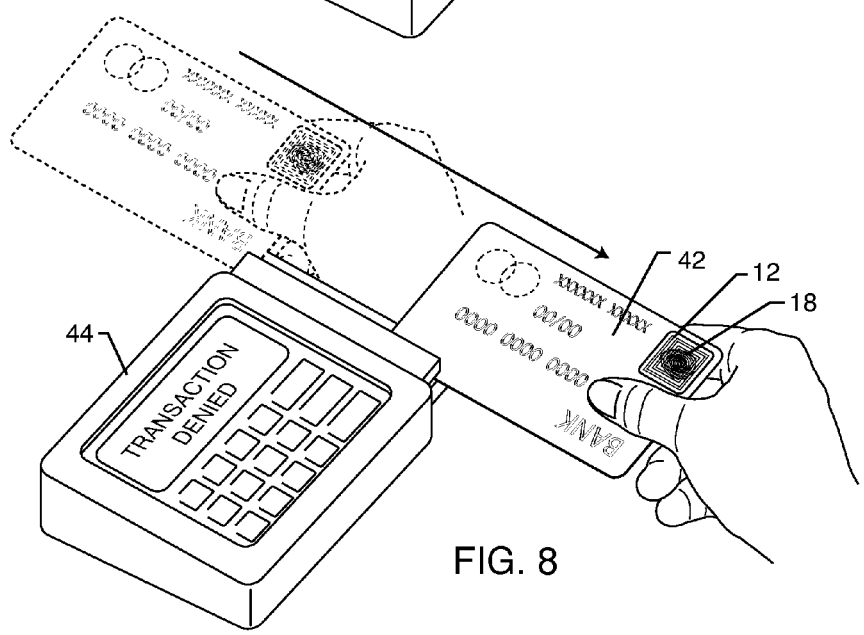
FIG. 7
FIG. 8

ANTI-IDENTITY THEFT AND INFORMATION SECURITY SYSTEM PROCESS

BACKGROUND OF THE INVENTION

The present invention relates to an anti-identity theft and information security system. More particularly, the invention relates to an anti-identity theft and information security system that requires positive identification through association of readable human biological information to facilitate the exchange of information, such as by requiring biometric information to activate an RFID tag before the RFID tag will transmit or receive information.

Identity theft is a form of stealing the identity of another person to assume that person's identity or to access resources of that person such as their financial information or other benefits. Needless to say, and unfortunately, identity theft is a growing problem in the United States and around the world. Obviously, an identity theft victim can suffer any one of a number of adverse consequences, including loss of rights, financial loss, loss of data or other information, and can even be held responsible for financial debts incurred or crimes committed by the perpetrator in the name of the victim. Oftentimes, sensitive and/or private electronic information is stolen or misappropriated through elaborate phishing schemes or other ploys designed to get users to inadvertently provide account information (e.g., username and/or password) or download and install malicious software to an electronic device used to store and/or transmit sensitive information. Additionally, financial institutions are particularly prone to data breaches as a result of malicious hackers vying to obtain sensitive financial information. It is oftentimes difficult, if not impossible, to secure lost information or other important documents once the information is misappropriated. Additionally, identity theft poses a major problem for national security as it increases the difficulty for law enforcement officials to properly identify criminals or for customs officials to stop terrorists from entering the country. This can be especially problematic at the border in view that the United States is now using RFID tags in passports to identify citizens entering and leaving the country.

Radio frequency identification ("RFID") is a technology that uses radio waves to exchange information between an electronic tag attached to an object and a reader, for the purpose of identification and tracking. Some of the most common electronic tags are passive and powered by an interrogation signal emitted from the reader. The amount of information and the distance the reader can interrogate the RFID chip varies by technology. For example, some electronic tags can only be read from several feet, while other tags can be read from much farther distances (e.g., beyond a line of sight with the reader). Such RFID tags have been used in automotive vehicle identification, automatic toll systems, electronic license plates, electronic manifests, vehicle routing, vehicle performance monitoring, banking (e.g., electronic checkbooks, electronic credit cards, etc.), security (e.g., personal identification, automatic gates, surveillance, etc.) and in the medical profession (e.g., identification, patient history, etc.).

In recent years, RFID has been used more as a means of personal identification. One problem with this use is that RFID was not originally designed to authenticate human beings. Rather, RFID was developed as a means to track storage containers, packages, etc. As a result of using RFID in personal identification, concerns have been raised over security and privacy. For example, as mentioned above, the United States started issuing passports having RFID tags therein. One problem with this is that the data on an RFID chip or tag can be cloned. For instance, data from an RFID chip may be copied onto another chip or to a recordable medium using a relatively inexpensive card reader and laptop. This is particularly problematic because passport information may be stolen without the knowledge of the owner. For example, for passports mailed to the owner, it would no longer be necessary to open the package to copy the information. Rather than open the package, the passport information is obtained by a reader that communicates with the RFID chip through the package materials. Thus, the information can be stolen without damaging the package and without the recipient's knowledge.

As a result, using RFID in passports may actually make the information stored therein less secure. This is certainly a problem regarding both national security and privacy. With respect to privacy, identity thieves can obtain personal details such as name, nationality, sex, date and place of birth, and a digital photograph of the passport holder from embedded RFID chips that broadcast such information when queried. If the RFID enabled passport has no security features, that information may be freely available. With respect to national security, identity theft jeopardizes the accurate identification of U.S. nationals or others who may be of interest to the U.S. government. One way to combat such theft is that the United States government added a metallic "anti-skimming" material along the exterior of the passport as a security feature. The metallic material is designed to prevent data from being read from a distance—especially when the passport booklet is closed.

Another security problem associated with RFID is the illicit tracking of RFID tags. In this regard, the ability to read a tag containing personal identification information or other secure or private data poses a risk to privacy, not only for individuals who may be carrying RFID enabled passports, but also for merchandise throughout the supply chain and thereafter. For example, Electronic Product Codes ("EPC's") embedded with RFID tags may easily be embedded in consumer products, such as electronics. Ideally, the EPC's are used in embedded RFID tags to track the products throughout the supply chain. But, without a secure means of controlling communication with the RFID tag, it may be relatively easy to illicitly track the product through the supply chain. Post purchase, these RFID tags may remain affixed to the products and may remain functional. Thus, it would be possible to deduce the location of the purchased product by simply scanning the RFID-enabled EPC tag. This can be particularly undesirable for the product owner. For example, a thief may simply identify products within a home by scanning the house with an RFID reader, in the event the RFID-enabled EPC tag remains active. Additionally, it may be possible to track the location of someone when the RFID-enabled tags are embedded in clothing.

One way to defend against data being stolen from an RFID chip or to prevent illicit tracking throughout the supply chain or post purchase is to use cryptography. For example, some tags use a "rolling code" scheme to enhance RFID tag security. Here, tag identification information changes after each scan to reduce the usefulness of observer responses. More sophisticated cryptographic devices engage in challenge-response authentications where the tag interacts with the reader. Here, secret tag information is never sent over an insecure communication channel between the tag and the reader. The tag and reader secure the channel when the reader issues a challenge to the tag, of which the tag responds with a result that is computed using a local cryptographic circuit key. The tag transmits the key back to the reader to complete the authentication cycle. The keys may be based on symmetric or public key cryptography.

One drawback of cryptographically-enabled tags is that they are typically more expensive and require more power than simpler equivalents. These drawbacks certainly limit the scope of potential deployment. As a result, some manufacturers developed RFID tags that use weaker or proprietary encryption schemes. Weaker encryption schemes are more susceptible to a sophisticated attack. One example of such an RFID tag is the Exxon-Mobil Speedpass, which uses a proprietary cryptographically-enabled tag manufactured by Texas Instruments to execute a challenge-response authentication at a lower cost. Another drawback of such challenge-response algorithms is that the RFID tags typically fail to have computational resources to process the cryptographic authentications without a significant cost increase associated thereto.

Another security measure designed to prevent information from being stolen from RFID tags is to shield the data stored on the RFID tag from an interrogation request from a reader. For example, sleeves or holders generally made from aluminum are designed to prevent reading information from an RFID chip. In this regard, the aluminum shield creates a Faraday cage to prevent the transmission of information to and/or from the RFID chip. The true effectiveness of this technology is unknown as it is still experimental. But, the shielding is thought to be at least partially dependent on the RFID tag. For example, low-frequency RFID tags (e.g., human or animal implantable tags) are relatively resistant to shielding while higher-frequency RFID tags (e.g., 13.56 MHz smart cards and access badges) are somewhat sensitive to shielding and tend to be difficult to read when within a few inches of a metal surface. One concern is that if the metal/aluminum is not completely effective at preventing transmission of sensitive data to and/or from the RFID chip, it may still be easy to obtain access to private information stored on the chip.

Thus, there exists a significant need for an anti-identity theft and information security system designed to prevent illicitly obtaining sensitive information by, for example, tracking and/or cloning information on an RFID chip. Such an anti-identity theft and information security system, especially when used in association with passports and credit cards, should make use of unique biological information to secure the information stored and transmitted therewith. In this regard, the transmission authentication should be used in association with a fingerprint or iris scan that prevents activation of the data stored on the transmitting device if the individual owning the passport or the credit card, or associated authorized users, are not present at the time the transmitting device is queried for access. The fingerprint and/or iris scan verifies that the user has the authority to use the information on the transmitting device for its intended purpose. The transmitting device will not otherwise activate without such authentication. The present invention fulfills these needs and provides further related advantages.

SUMMARY OF THE INVENTION

The anti-identity theft and information security system process disclosed herein includes storing secure information in a database in association with an electronic device having a communication circuit for sending and receiving data. The communication circuit preferably includes a wireless communication circuit and/or a wired port. Biometric information from a user can be read with a scanner. The biometric information scanned by the reader may include a fingerprint, an iris, or a facial feature. As such, the biometric information is used to authenticate the identity of the user attempting to gain access to and use the electronic device. Once authenticated, a secure data communication line may be established with a remote device. Once established, secure information in the electronic device is unlocked to facilitate unilateral or bilateral transmission of data between the electronic device and the remote device.

Secure information in the electronic device may be assigned a certain access level. For example, low security information may be more accessible and require fewer authentications than high security information. Preferably, the secure information assigned the highest level of security requires transmission through the wired port. Additionally, to access the highest level secure information, the user may need to authenticate at least three forms of biometric information, including, e.g., a fingerprint, an iris, or a facial feature. Preferably, authentication requires authenticating the fingerprint, the iris and/or the facial feature before unlocking access to the secure information. This insures that secure information on the electronic device (e.g., an identification card, a Smartphone, a credit card, or a passport) remains locked and inaccessible before being transmitted to the remote device (e.g., a credit card or a passport). Such an anti-identity theft and information security system may be used in association with approving an internet transaction using the biometric information. In this embodiment, the remote device is an internet server and the information is exchanged therewith through an internet website that may be configured to facilitate transaction data.

In another aspect of the anti-identity theft and information security system process, an RFID tag coupled to the electronic device may be activated with a fingerprint. In this embodiment, the activating step may include completing an RFID tag circuit keyed to a unique fingerprint of one or more authorized users. RFID tag activation may be terminated upon the removal of the unique fingerprint from the RFID tag circuit. Continued completion of the RFID tag circuit with the fingerprint may also be used to simultaneously activate a swipe strip on, e.g., a credit or debit card. Preferably, the swipe strip is otherwise locked when the fingerprint is not completing the RFID tag circuit. Furthermore, the scanner may be coupled to the electronic device such that the establishing step matching biometric information from the electronic device with a biometric identity database associated with the remote device. The biometric identity database may further be associated with a third party financial institution. The electronic device may further receive encrypted biometric data from the remote device and match that biometric data with a biometric identity database associated with the electronic device. This allows authentication and activation of the electronic device even when the scanner may not be directly coupled to the electronic device. The secure information should be restricted depending on the security clearance level of the user providing the biometric information.

In another alternative embodiment of the anti-identity theft and information security system, the electronic device may be synced with a product carrying an RFID tag. As such, the system may provide for a method of activating and/or reprogramming the RFID tag with the electronic device. Preferably, the RFID tag is locked with encrypted data so that the RFID tag is only responsive to radio frequencies carrying an authentication code generated by supplying the biometric information. This enhances the security of the information used in association with the RFID tag on the product as only those that supply authorized biometric information are allowed to access the information on the tags. The system may even assign a unique identification number to the RFID tag to uniquely identify the product. A catalog list of products may be stored in a local database and contain product location information. In this respect, the RFID tags are used to locate the products through simple interrogation of the RFID tag (e.g., a passive RFID tag) by a reader. This feature is particularly preferable as it would be possible to identify the location of a product even when that product does not operate electronically or is otherwise "off". Furthermore, energizing the passive RFID tag with said reader may further be used to operate the power state of the product. That is, an energized RFID tag may be used to trigger a switch that either turns the product "on" (when it is "off") or turns the product "off" (when it is "on").

In another aspect of the anti-identity theft and information security system process, secure information may be stored in association with an electronic device having a communication circuit comprising a wireless communication circuit and a wired port for sending and receiving data. Biometric information may be read by a scanner (e.g., a fingerprint, iris or facial feature) and an RFID tag coupled to the electronic device may be activated by completing an RFID tag circuit keyed to a unique fingerprint. Next, the identity of a user is authenticated through use of the biometric information received by the RFID tag circuit. As a result, the system is able to establish a line of data communication with a remote device, unlock access to the secure information and transmit the secure information between the electronic device and the remote device.

In this embodiment, the electronic device may include an identification card, a Smartphone, a credit card, or a passport and the remote device may include a credit card or a passport. Internet transactions may be approved by securely transmitting the biometric information with an internet server. Authentication may, in this step, require authenticating the fingerprint, the iris and the facial feature before unlocking access to the secure information. Activation is terminated by removing the fingerprint from the RFID tag circuit. Alternatively, a swipe strip on a credit card or debit card may be unlocked or locked depending on whether the fingerprint is or is not completing the RFID tag circuit. Continued completion of the RFID tag circuit with the fingerprint may simultaneously activate the swipe strip. Preferably, the scanner is coupled to the electronic device and the line of data communication is established by matching biometric information from the electronic device with a biometric identity database associated with the remote device.

In an alternative embodiment, the anti-identity theft and information security process includes storing secure information in association with an electronic device having a communication circuit for sending and receiving data, syncing the electronic device with a product carrying an RFID tag, cataloging multiple products in a local database and storing location information therewith, and locating one of the products via a passive RFID tag when the product is off. Furthermore, biometric information such as a fingerprint, an iris, or a facial feature is read with one or more scanners, an identity of the user may be authenticated in connection with one or more of the aforementioned biometric information before unlocking access to the secure information, and a data communication line may be established with a remote device for transmitting secure information between the electronic device and the remote device after access to the secure information is unlocked. In this embodiment, the RFID tag is preferably locked with encrypted data so that the RFID tag is only responsive to radio frequencies carrying an authentication code generated by supplying the biometric information.

In another aspect of this embodiment, the RFID tag may be activated or reprogrammed wirelessly using the electronic device. Preferably, access to the information stored in association with the RFID tag is restricted to authorized users that provide proper security clearance credentials through the use of biometric information. Each user may have different access credentials depending on the access level assigned to the secure information. The biometric identity scanner may be coupled to the electronic device such that biometric information from the electronic device is matched to a user having a profile stored in a biometric identity database associated with the remote device. Only upon positive identification of an authorized user would the system, for example, approve an internet transaction using the biometric information. In this respect, the remote device receives encrypted biometric data from the electronic device for purposes of identifying the user and providing notification of the authorized use. Furthermore, the electronic device may assign a unique identification number to the RFID tag and operate the power state of the product via a passive RFID tag. Such a passive RFID tag may communicate with electronic devices such as an identification card, a Smartphone, a credit card, or a passport. Furthermore, the remote device may include a credit card or a passport.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6 is a planar view of a credit card containing a fingerprint-enabled RFID chip;

FIG. 7 is an environmental view illustrating activation of the credit card through use of the fingerprint-enabled RFID chip;

FIG. 8 is an environmental view similar to FIG. 6, illustrating the denial of the transaction when the RFID chip is not activated by the fingerprint;

DETAILED DESCRIPTION OF THE PREFERRED EMBODIMENTS

Figure 1:
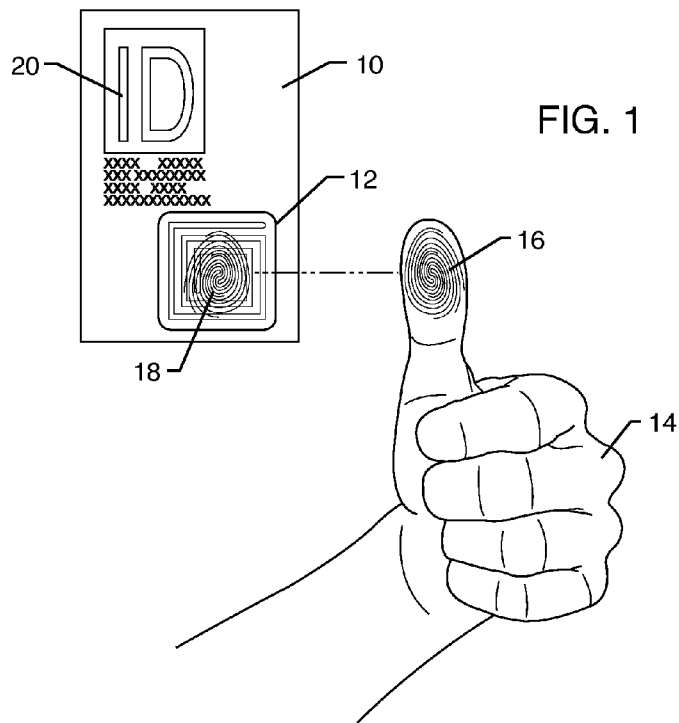
FIG. 1 is an environmental view illustrating an RFID chip for use in association with fingerprint identification.
Figure 2:
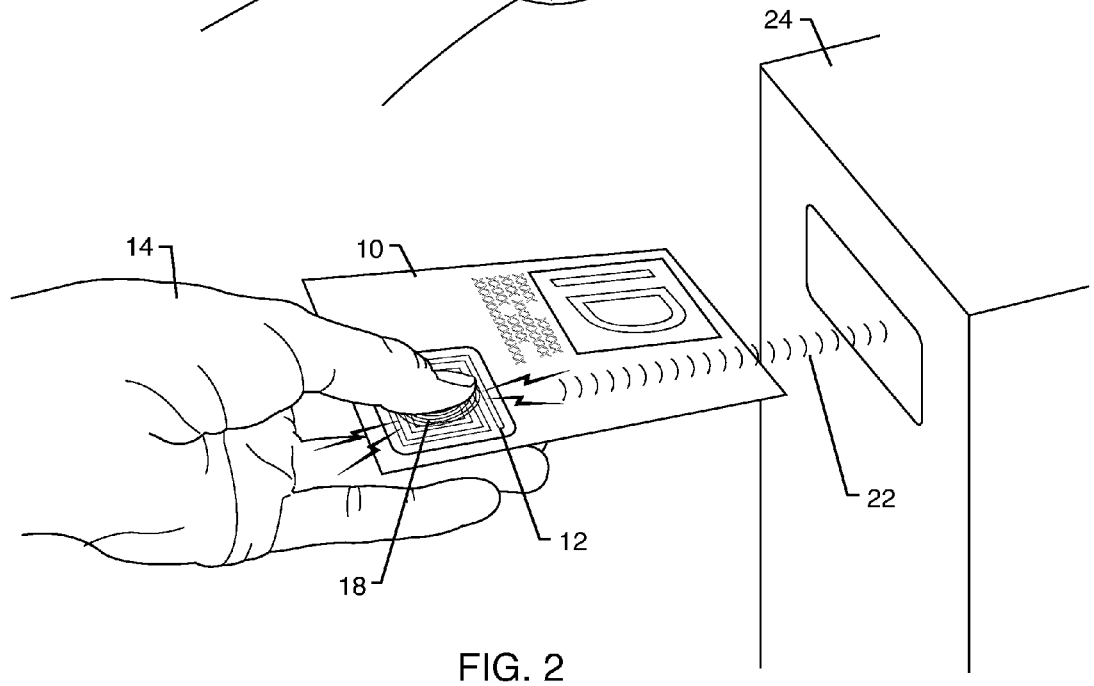
FIG. 2 is an environmental view illustrating activation of the RFID chip with the fingerprint such that it can be read with a reader.

As shown in the drawings for purposes of illustration, the present invention for an anti-identity theft and information security system is shown with respect to several embodiments in FIGS. 1-12. FIG. 1 illustrates one embodiment of the anti-identity theft and information security system in the form of an identification card 10. The identification card 10 may be a passport, driver's license, military ID, benefit's card (e.g., Medicare or Medicaid), etc. The identification card 10 includes an RFID tag 12 responsive to fingerprint identification. For example, FIG. 1 illustrates a user's hand 14 having a thumbprint 16 that activates the RFID tag 12 on the identification card 10. Preferably, the thumbprint 16 is integrated into the RFID tag 12 such that the configuration of the unique fingerprint provides the connections necessary to activate the RFID tag 12. In this regard, the RFID tag 12 is inoperable unless the user places the thumbprint 16 at the receptor 18 integrated into the RFID tag 12. The thumbprint 16 may provide the necessary connections, resistances, voltage drops, or other connections to activate the circuitry when placed on the receptor 18. Activating the RFID tag 12 enables it to respond to a reader querying the RFID tag 12 for information. The RFID tag 12 may include information such as name, address, age, birth date and location, a picture of the owner of the identification card 10, weight, or other information readily associated with personal identification. The printed information area 20 of the identification card 10 need only contain minimal information such as the person's name and possibly a picture. Other pertinent information is secured to the RFID tag 12 through use of the anti-identity theft and information security system disclosed herein.

The key with this embodiment of the anti-identity theft and information security system is that biometric information, such as the thumbprint 16, is used to activate the RFID tag 12. With respect to FIG. 2, the hand 14 is shown placing the thumbprint 16 on the receptor 18 integrated into the RFID tag 12. The thumbprint 16 completes the circuitry within the receptor 18 that enables the RFID tag 12 to be responsive to a signal 22 emitted by a reader 24. In this particular embodiment, the RFID tag 12 would not otherwise respond to the signal 22 emitted by the reader 24 but for activation of the thumbprint 16 on the receptor 18. An activated identification card 10 may then freely communicate with the reader 24. In this regard, the reader 24 may obtain information from the RFID tag 12 as long as the thumbprint 16 is properly disposed on the receptor 18 to enable the circuitry of the RFID tag 12 to be responsive to the signal 22 emitted by the reader 24. Removing the thumbprint 16 from the receptor 18 will cause the RFID tag 12 to stop responding to the reader 24.

Figure 3:
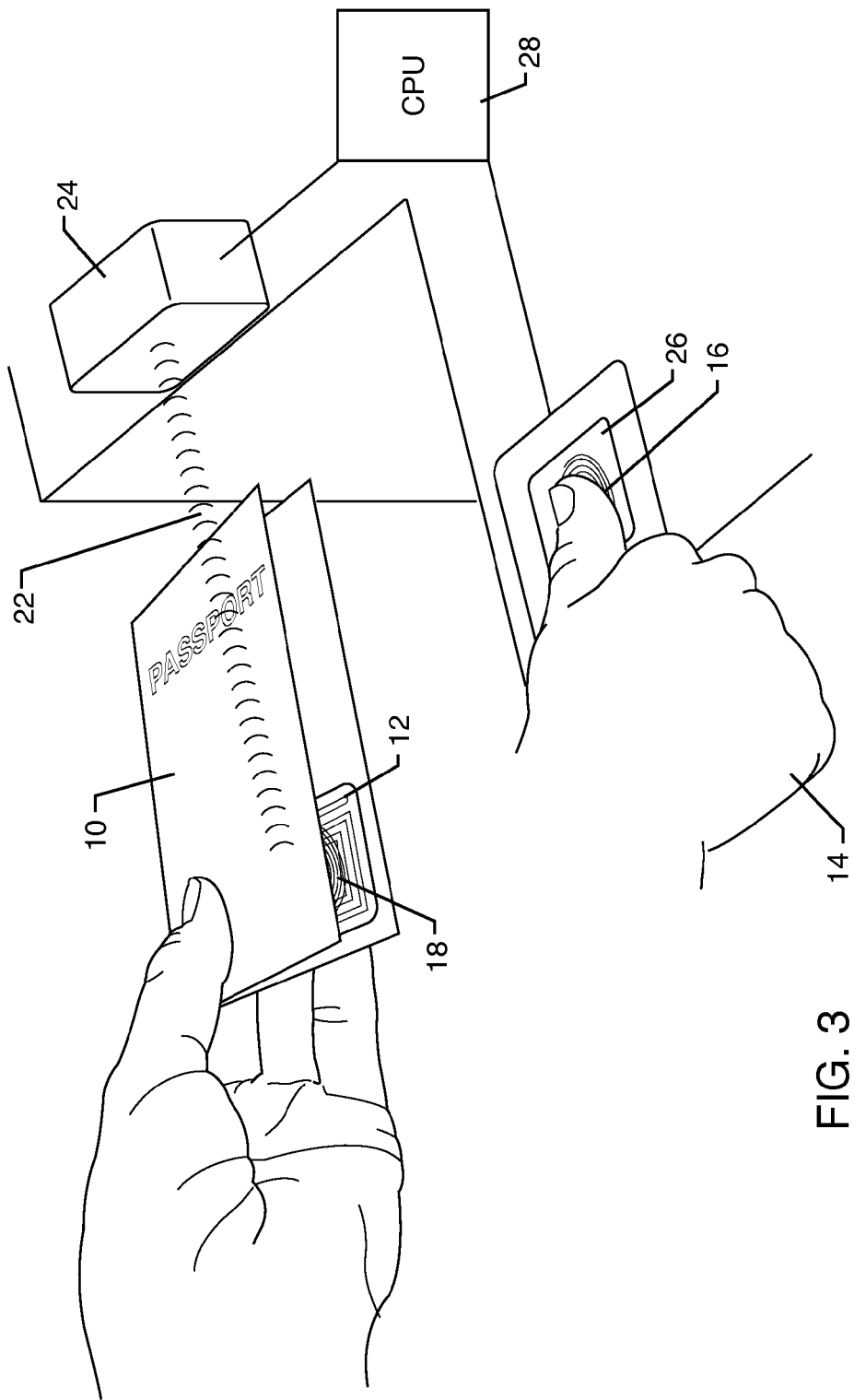
FIG. 3 is an environmental view similar to FIG. 2, illustrating fingerprint authentication with a platform scanner.

FIG. 3 illustrates an alternative embodiment of the RFID anti-identity theft and security system. In this embodiment, the reader 24 may correspond with the RFID tag 12 by means other than placement of the thumbprint 16 on the receptor 18. Here, the thumbprint 16 of the hand 14 is placed on a thumbprint scanner 26 to digitally read the thumbprint 16. Information obtained by the thumbprint scanner 26 is processed by a computer 28 to determine the characteristics of the thumbprint 16. The computer 28 can then activate the reader 24 in response to the thumbprint 16 being scanned by the thumbprint scanner 26. In this respect, the computer 28 identifies characteristics of the unique thumbprint 16, which are used to communicate with and activate the RFID tag 12. The computer 28 instructs the reader 24 to send the signal 22 with an encrypted code specific to the identity of the thumbprint 16. This particular embodiment is advantageous in that the reader 24 emits the signal 22 that activates only with the RFID tag 12 associated with the unique thumbprint 16. Thus, the reader 24 does not inadvertently read or activate other RFID tags that are not related to the person scanning their thumbprint 16 on the thumbprint scanner 26. The RFID tag 12 will only respond to the signal 22 as long as it contains information that identifies the owner's thumbprint 16. This step is important for security because the RFID tag 12 will only respond to the signal 22 as long as the information identified by the thumbprint scanner 26 and processed by the computer 28 matches that information stored in the RFID tag 12. If the information in the signal 22 does not match the thumbprint 16, the RFID tag 12 simply will not respond to the reader 24. This enhances the security of the identification card 10, in this case a passport, such that the RFID tag 12 cannot be inadvertently read by a stray reader designed to illicitly capture or clone information from the RFID tag 12.

Figure 4:
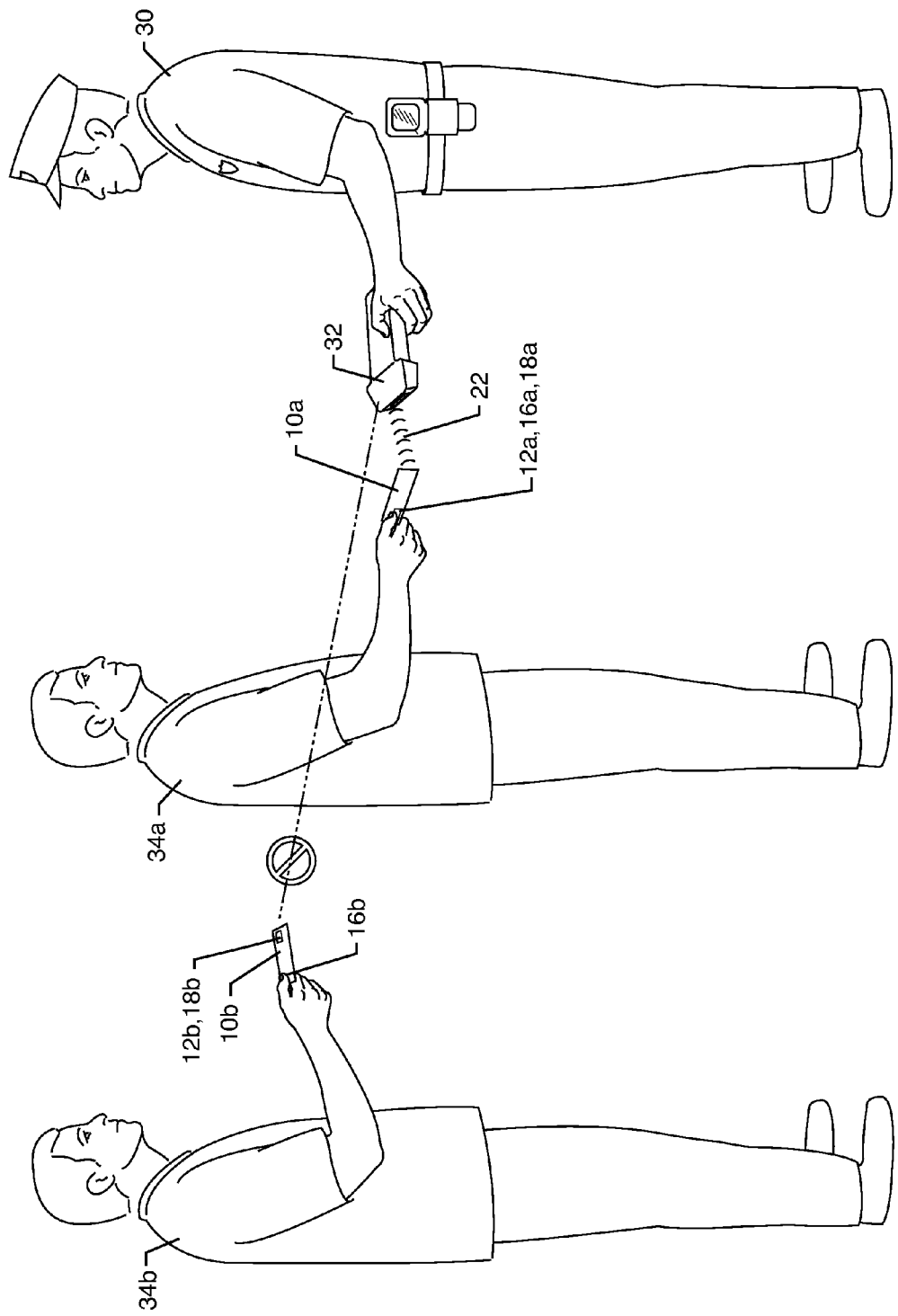
FIG. 4 is an environmental view illustrating automatic authentication and reading of an RFID chip enabled through use of a fingerprint.

This particular security feature can be particularly desirable for customs security. For instance, FIG. 4 illustrates a customs officer 30 operating a hand-held reader 32 to process citizens 34a and 34b. As shown in FIG. 4, the citizen 34a having the thumbprint 16a over the receptor 18a activates the RFID tag 12a therein such that it is responsive to the signal 22 emitted by the hand-held reader 32. Information stored on the RFID tag 12a is communicated back to the hand-held reader 32 in response to the signal 22. The RFID tag 12a only responds to the signal 22 because the thumbprint 16a from the citizen 34a is placed over the receptor 18a integral to the operation and activation of the RFID tag 12a. The customs officer 30 can quickly and positively identify the citizen 34a through use of information provided to the hand-held reader 32 from the activated and authenticated RFID tag 12a. A security device, such as a metallic sleeve may be used with this embodiment to limit the response range of the RFID tag 12. Alternatively, the citizen 34b is shown holding the identification card 10b without placing the thumbprint 16b over the receptor 18b. The signal 22 emitted from the hand-held reader 32 is non-receptive when it contacts the RFID tag 12b because the thumbprint 16b does not authenticate the RFID tag 12b with the receptor 18b. In this respect, the hand-held reader 32 will not receive a response from the RFID tag 12b despite emitting the signal 22, which may contact the RFID tag 12b. This enables the customs officer 30 to quickly scan and process passports.

One aspect of the anti-identity theft and information security system described herein is that the biometric data used in association with the RFID tag is nearly impossible to clone or replicate. For example, only RFID tags issued by the United States Government will be responsive to readers positioned at customs checkpoints. The only way to activate the RFID tag in the passport is to associate biometric data (e.g., a fingerprint or iris scan) with that RFID tag. First, a fraudulent RFID tag will be unable to communicate with the reader because the tag information is not otherwise entered or stored within the reader's system (e.g., a customs database). Second, even if the passport is stolen, the thief will be unable to activate the RFID tag because the fingerprint or iris of the thief will not match the information on the RFID tag. The RFID tag can never be authenticated in response to a signal emitted by a reader without the owner's biometric data. Thus, it is impossible for the information on the RFID tag to be cloned or stolen because the requisite biometric data needed to activate the RFID tag is not available without the person registered to the RFID tag. In essence, the RFID tag is useless without the actual owner or authorized user. This is beneficial even if the passport is lost or stolen because minimal information is printed or displayed in the information area 20 on the passport itself. This minimizes the risk of identity theft because crucial information such as social security number, date of birth and picture are stored locally within the memory of the RFID tag. Preferably, the information is encrypted such that it would be impossible to extract the information from the RFID tag in the event that the passport is lost or stolen.

Figure 5:
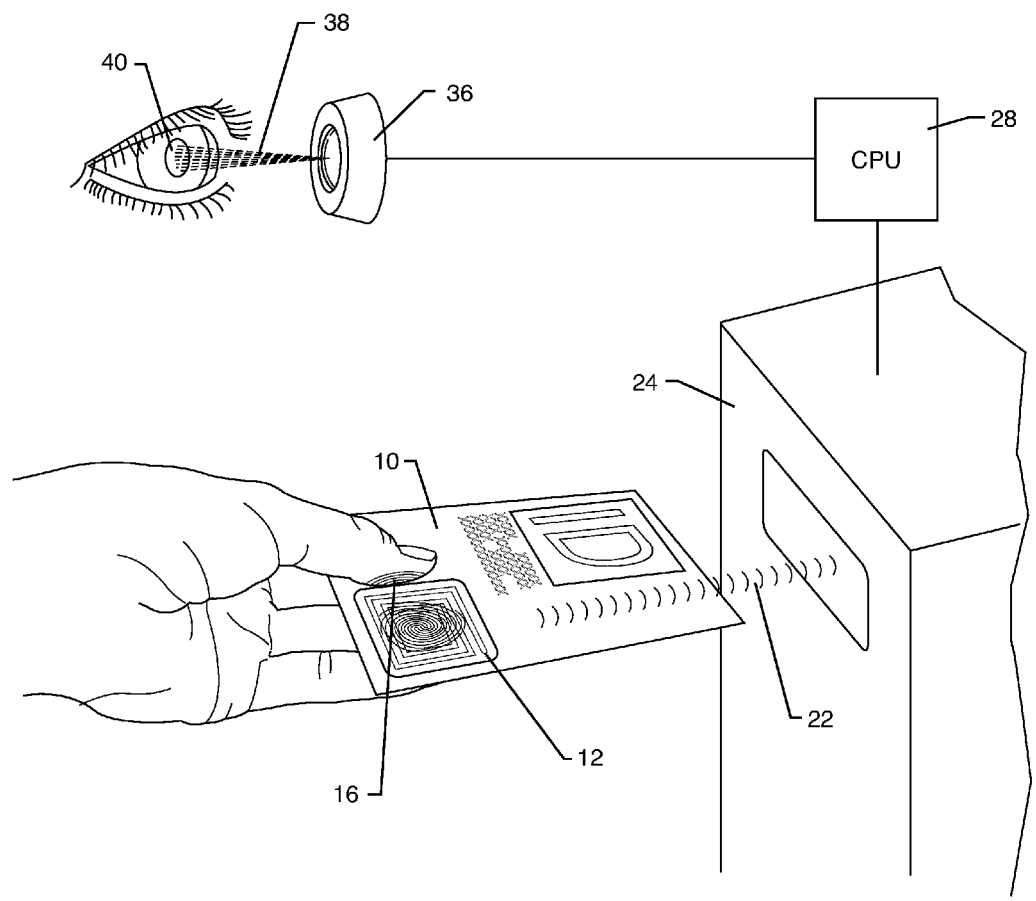
FIG. 5 is an environmental view illustrating authentication of the RFID chip through use of an iris scan.

FIG. 5 illustrates an alternative embodiment of the anti-identity theft and information security system. Here, the identification card 10 and associated RFID tag 12 communicate with the reader 24 via the signal 22 authenticated by an iris scan. The computer 28 activates an iris scanner 36, which has a beam 38 that scans the unique identification of an iris 40 associated with the person holding the identification card 10. The unique identification of the iris 40 is captured by the iris scanner 36 and processed by the computer 28. The computer 28 then relays that information to the reader 24 such that the signal 22 emitted therefrom conveys the unique identifying information of the iris 40 to the RFID tag 12. In this embodiment, the thumbprint 16 does not need to be disposed over the receptor 18 to activate the RFID tag 12. Instead, the signal 22 includes unique identification information specific to the information retrieved by the iris scanner 36. The RFID tag 12 recognizes the unique signal 22 as a result of the computer 28 processing the unique information associated with the iris 40. Accordingly, the RFID tag 12 knows that the person associated with the information stored in the identification card 10 is authenticated. The RFID tag 12 may respond to the signal 22 such that the reader 24 may then obtain information from the RFID tag 12 on the identification card 10. If the information obtained from the iris 40 by the computer 28 does not match the identification information stored in association with the RFID tag 12, the signal 22 emitted by the reader 24 will not match and, thus, the RFID tag 12 will not respond to the reader 24. In this respect, this enhances the security of the information stored in the identification card 10 because the reader 24 will be unable to obtain a response from the RFID tag 12 without the computer 28 first positively identifying the owner of the identification card 10 through the use of the iris scanner 36.

FIGS. 6-8 illustrate an alternative embodiment for using the anti-identity theft and information security system with a credit card 42. Like the embodiments above, the credit card 42 includes an RFID tag 12 with a receptor 18 that matches the thumbprint 16 of the owner of the credit card 42. In this embodiment, the RFID tag 12 may simply be replaced with a fingerprint reader incorporating receptor 18 if wireless communication is unnecessary. When authenticated with the receptor 18, the credit card 42 (or other card that can be swiped, such as a debit card) is used as any other credit card known in the art. That is, the user places the thumbprint 16 on the receptor 18 and passes the swipe strip through a credit card reader 44 to complete a transaction for the purchase of goods or services, for example. In FIG. 7, the owner of the credit card 42 is shown disposing the thumbprint 16 on the receptor 18 to activate the RFID tag 12 on the credit card 42, as described above with respect to FIGS. 1 and 2. When the credit card 42 is passed through the credit card reader 44, the transaction is approved because the RFID tag 12 activates the information on the credit card 42. Alternatively, as shown in FIG. 8, in the event that the credit card 42 is passed through the credit card reader 44 without placing the thumbprint 16 on the receptor 18, the transaction will be denied. In effect, a lost or stolen credit card 42 cannot be activated or used by any other person other than the owner. This is because the only person that can activate the RFID tag 12 is the one who has a thumbprint 16 that matches the receptor 18. Without closing the circuit on the RFID tag 12 with the proper thumbprint 16, the credit card 42 simply will not activate to process transactions.

The credit card 42 may be used in conjunction with the credit card reader 44 (which requires use of a swipe strip) or wirelessly. In the former embodiment, the credit card 42 must be swiped in accordance with the embodiments shown in FIGS. 7 and 8. Alternatively, in the event that the credit card 42 is used wirelessly, the user need only place the thumbprint 16 on the receptor 18 to activate the RFID tag 12 for wireless communication. Here, the credit card 42 may be passed by a reader in much the same way as the Mobil Speedpass is used currently. The credit card 42 disclosed herein is advantageous over the Mobil Speedpass because the receptor 18 requires positive identification with the owner of the credit card 42 for the RFID tag 12 embedded therein to even respond to the reader at the gas station. In this respect, unique biometric data is used to positively identify and authenticate the use of the credit card 42—as opposed to some proprietary or complex cryptographic algorithm.

Figure 9:
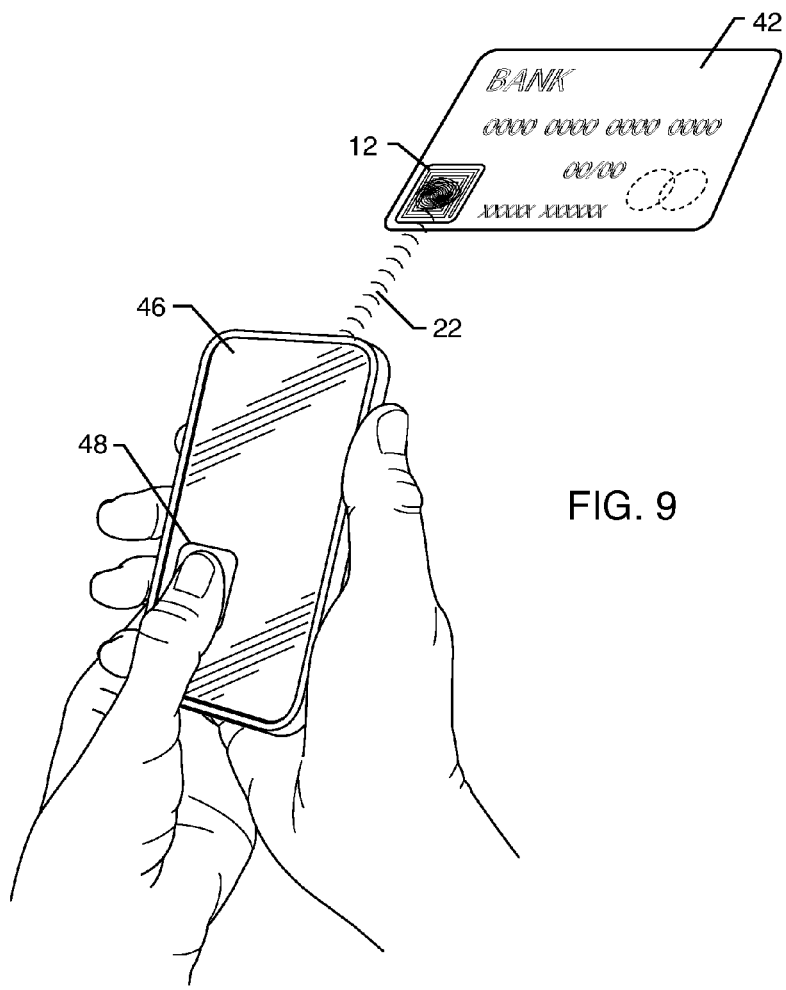
FIG. 9 is an environmental view illustrating activation of the RFID chip on a credit card by scanning a fingerprint with a Smartphone.
Figure 10:
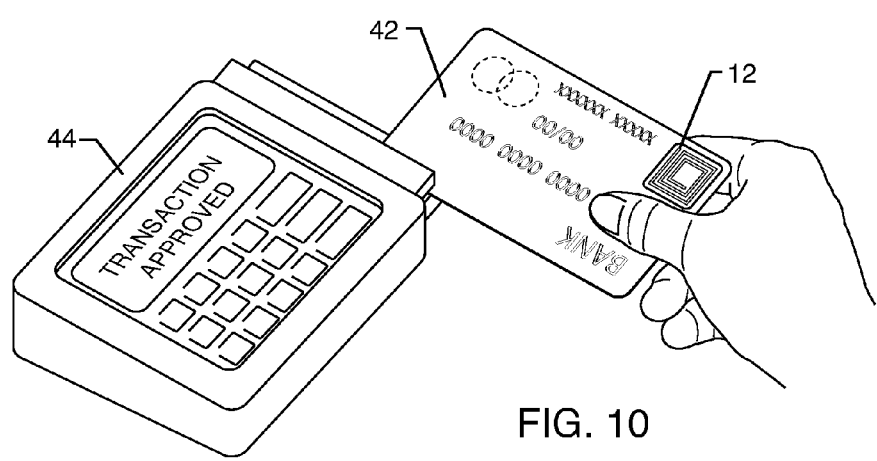
FIG. 10 is an environmental view illustrating successful use of the credit card activated in FIG. 9.

FIG. 9 illustrates an alternative means for activating the RFID tag 12 used in association with the credit card 42. Here, a Smartphone 46 has a thumbprint reader 48 integral thereto for reading the thumbprint 16. The Smartphone 46 processes the thumbprint 16 in the same way as did the computer 28. Unique identification information is deduced from the thumbprint reader 48 and transmitted to the RFID tag 12. This signal 22 includes an encrypted code carrying information specific only to the thumbprint 16 of the user owning the credit card 42. The RFID tag 12, having previously been configured only to be responsive to a signal carrying the encrypted code unique to the thumbprint 16 of the owner of the credit card 42, is responsive to the signal 22. In this particular embodiment, the Smartphone 46 is used to activate the credit card 42 for a predetermined duration, such as twenty seconds. Such activation enables the user to swipe the credit card 42, as shown in FIG. 10, without placement of the thumbprint 16 on the receptor 18 on credit card 42. In this respect, the RFID tag 12 does not necessarily need to include the receptor 18 (e.g., as shown in FIG. 10) to activate the credit card 42.

Initially, activating the credit card 42 requires that the Smartphone 46 transmit a unique signal 22 to the RFID tag 12 carrying the unique identification information of the thumbprint 16 of the user. The RFID tag 12, once activated, becomes responsive to the signal 22 carrying the unique identification code that correlates to the specific thumbprint 16 of the user owning the credit card 42. The Smartphone 46 transmits the signal 22 to the RFID tag 12 requesting that the credit card 42 be activated (or deactivated) in order to process a transaction. The RFID tag 12 activates the credit card 42 such that when the user swipes the credit card 42 through the credit card reader 44 (FIG. 10), the transaction is approved.

Such authentication of the credit card 42 can be used with online purchases as well. In this case, instead of transmitting the signal 22 to the RFID tag 12 on the credit card 42, the user simply scans the thumbprint 16 with the thumbprint reader 48 with the Smartphone 46 (or another comparable electronic device connected to an internet-enabled device) for use online. The information is processed by the computer (such as the Smartphone 46 in this embodiment) to prepare transaction approval for the online purchase. The thumbprint information captured by the thumbprint reader 48 is securely transmitted to the merchant and/or the issuing credit card company to positively identify the account holder of the credit card 42. Upon confirmation that the thumbprint 16 matches the account information associated with the owner of the credit card 42, the online transaction may proceed and be authenticated to approve the purchase. In effect, this particular embodiment will eliminate any need for providing security codes in association with the credit card 42 because the thumbprint 16 is the vehicle for authentication. Likewise, an iris scanner, as described in detail above, may also be used in the same means as the thumbprint reader 48 for extracting unique biometric information from the credit card owner to authenticate the purchase online. The iris scanner would just need to be coupled (e.g., wired or wirelessly) to the computer to process the biometric data. In another alternative embodiment, authentication could occur via the facial recognition technology described below. Of course, the credit card owner could also activate additional authorized users through use of the Smartphone 46, or comparable electronic device, and the thumbprint reader 48.

Figure 11:
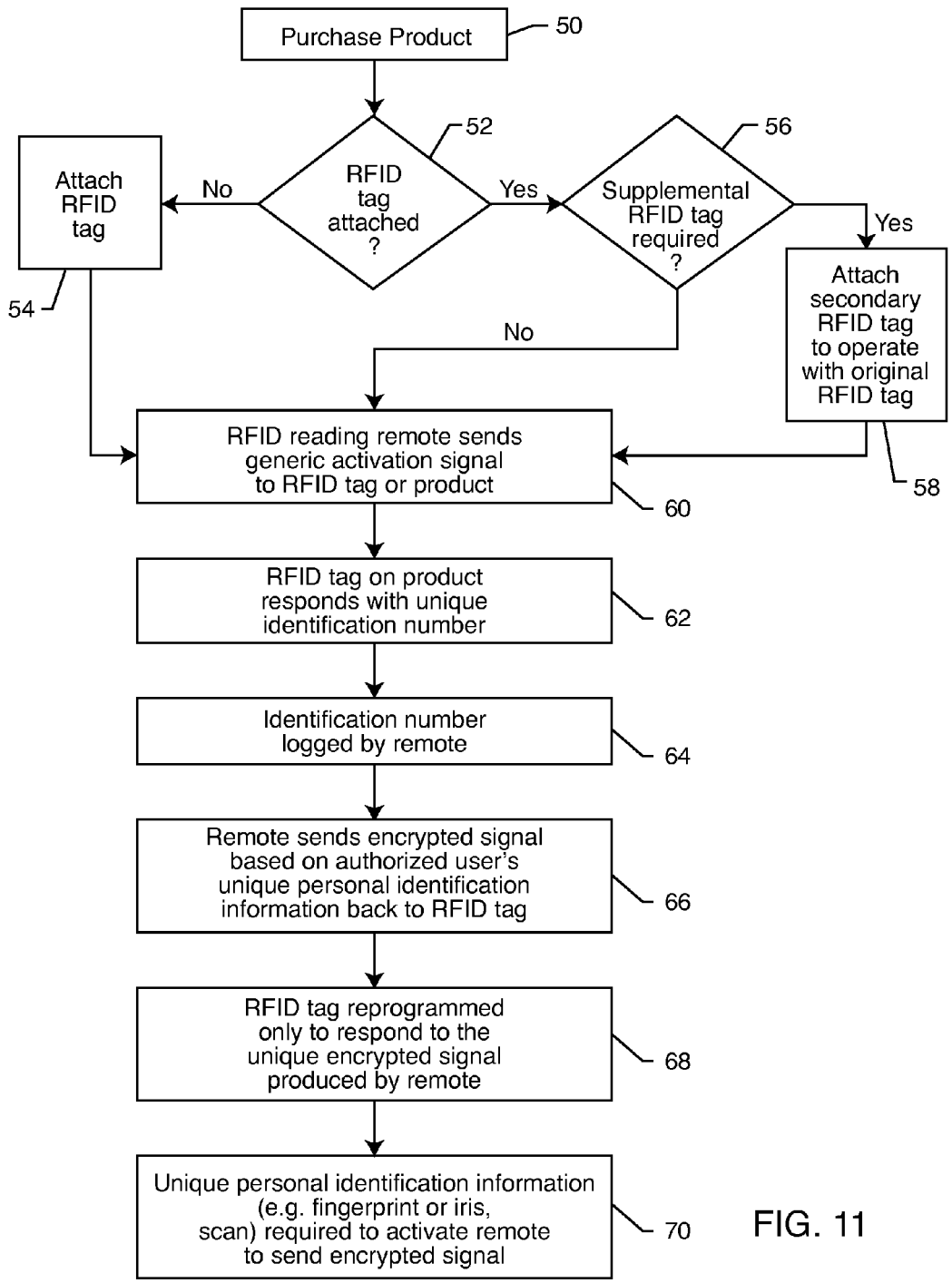
FIG. 11 is a flow chart illustrating the application of the anti-identity theft and information security system to consumer products.

The anti-identity theft and information security system disclosed herein also has application in the arena of consumer goods, specifically supply chain management and post-purchase protection. For instance, one drawback of marking consumer products with RFID tags is the illicit tracking throughout the supply chain and thereafter when a consumer purchases the product. The flowchart illustrated with respect to FIG. 11 and the environmental view shown in FIG. 12 address concerns related to identifying products post-purchase. For instance, FIG. 11 illustrates that the first step in providing such security is for a consumer to purchase a product (50). For reasons associated with inventory control, it may be desirable to have an RFID tag attached to the product purchased in step (50). Thus, the next step is to identify whether an RFID tag is attached to the product (52). In the event that an RFID tag is not attached, the next step is to attach an RFID tag (54) that can be incorporated into an inventory control system for tracking and locating the product within a blanketed area that may be scanned by one or more readers in range. However, if an RFID tag is already attached to the purchased product, the next step would be to determine whether a supplemental RFID tag is required (56). In this case, sometimes RFID tags attached to products for supply chain purposes are incompatible with readers that do not otherwise use a proprietary in-house cryptographic code unique to the supplier. In this case, it is necessary to attach a secondary RFID tag to operate alone or in conjunction with the original RFID tag (58).

If the supplemental RFID tag is not required, the user proceeds to step (60), which involves activating, or reprogramming when an RFID tag already exists, the RFID tag attached to the product to be responsive only to a unique signal. Similar to the above, the product owner uses biometric data, such as a fingerprint or iris scan, to generate an encrypted and unique authentication code to program the RFID tag on the purchased product. The purpose of creating this unique identification code is so the RFID tag attached to the product only responds to that particular encrypted code, and not some stray code that may be emitted by a randomly generated signal from an illicit reader. The RFID tag attached to the product identifies the request to authenticate and activate the RFID tag for use only with this particular encrypted and unique identification signal. The RFID tag on the product responds to the reader with a unique identification number (62) specific to that particular product. This unique identification number is much like a serial number so that the system can uniquely identify that particular product. Accordingly, the identification number is logged by the remote (64) or other electronic device for inputting the purchased product into the owner's inventory control system. Preferably, the identification number is stored in a remote database keyed only to be accessible by authorized users that present a similar authorization code unique to biometric data of the owner (such as a thumbprint or iris scan). The remote then sends an encrypted signal based on the authorized user's unique personal information back to the RFID tag (66). The RFID tag is then reprogrammed only to respond to the unique encrypted signal produced by the remote (68), or other interrogation device authenticated by the product owner's biometric data. Thereafter, the unique personal identification information is required to activate the remote to send the encrypted signal (70).

Figure 12:
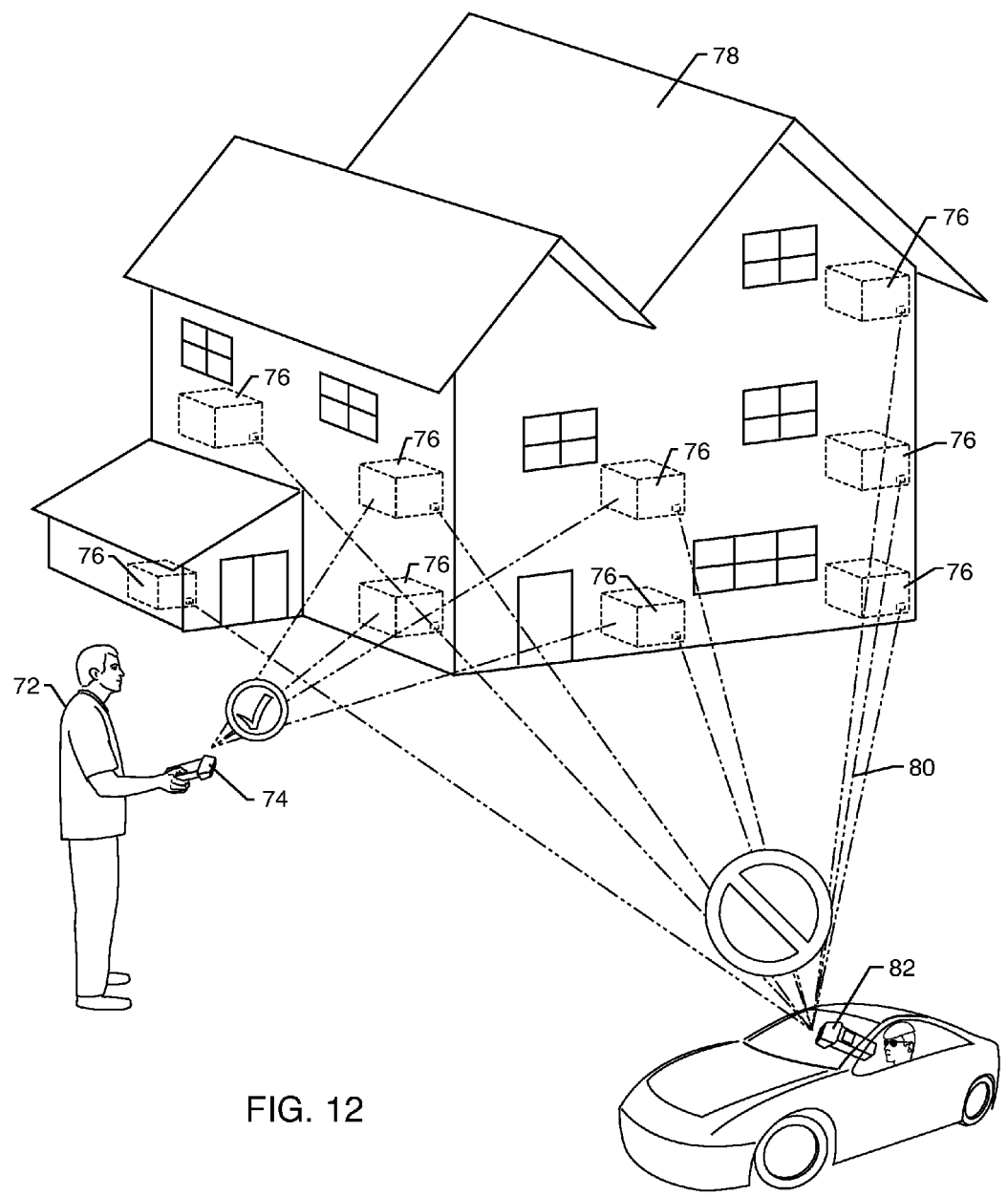
FIG. 12 is an environmental view illustrating secure operation of the anti-identity theft and information security system for products within a home.

FIG. 12 illustrates an environmental view of the benefits of the anti-identity theft and information security system described above with respect to FIG. 11. As shown, an owner 72 uses a reader 74 activated by biometric data to scan various products 76 located within a home 78 of the owner 72. Each of the products 76 have been configured with RFID tags that are responsive only to signals produced by a reader having the encrypted authentication signal unique to the biometric data of the owner 72. This enables the owner 72 to scan the home 78 to identify which products 76 are located therein. This is particularly beneficial from an inventory control standpoint in that the owner 72 may immediately identify a catalog list of products 76 within the home 78. In fact, it may even be possible for the owner 72 to identify the location of individual products 76 within the home 78, depending on the sensitivity of the reader 74 (or other generic readers placed throughout the home 78). It is particularly preferable if the reader 74 can provide a general location (e.g., a room) or, even more preferably, a specific location (e.g., a particular location within a room). Also beneficial with this system is that an illicit signal 80 emitted by an illicit reader 82 will not receive a response from the RFID tags on the products 76 because the illicit signal 80 does not contain the specific encrypted information unique to the biometrics of the product owner 72. The RFID tags on the products 76 that receive the illicit signal 80 fail to respond because the tags are only configured to respond to a specific signal unique to the owner 72. The illicit signal 80 fails to carry the necessary encryption code because the signal is generated from an illicit reader 82 that was not activated by the biometrics (e.g., a thumbprint or iris scan) of the product owner 72. Accordingly, this greatly enhances the security of the products located within the interior of the home 78 in that this information is not accessible to anyone but the product owner 72. Of course, like with the embodiments described above, the owner 72 may authorize others to activate the reader 74 to query the products 76 within the home 78.

Another aspect of using the anti-identity theft and information security system in association with the products 76 is that the owner 72 may control certain electronic devices remotely. For example, the owner 72 may use the reader 74 to query the state of one or more of the products 76. The passive RFID tags in the products 76 will respond to the reader 74 in accordance with the embodiments described above when the owner 72 properly authenticates the query. The RFID tags reply to an authenticated query regarding the state of the electronic device. The owner 72 may utilize the reader 74 to send activation or deactivation signals to the RFID tags, depending on the power state of the electronic equipment. In this respect, the owner 72 may use the reader 74 as a remote device to control the operational state of various electronic products 76 located within the home 78. This particular feature is ideal for use in power conservation, for example, in the event the owner 72 may have forgotten to turn off an electronic device before leaving the home 78.

Alternatively, the owner 72 may remotely operate the electronic equipment in the home 78 by using the Internet to connect to and operate readers that may be disposed within the home 78. The owner 72 may use a Smartphone to authenticate biometric data that gets transmitted through the Internet to a home computer that operates one or more local readers disposed within the home 78. Those readers can then communicate with the products 76 to determine the operational state of such products 76. The readers emit a signal that provides enough energy for the RFID tags coupled to the products 76 to change the power state of an electronic device—i.e., the electronic device can either be powered down or turned on. The owner 72 may have the option to create a schedule wherein the readers in the home 78 automatically activate or deactivate the electronic products 76.

Another additional benefit is that the owner 72 can communicate with and find electronic devices carrying a passive RFID tag even when that device may be turned "off" in the home 78. This may be beneficial, for example, in the event the owner's cell phone battery dies and the owner 72 is otherwise unable to locate the phone. The owner 72 need only activate the reader 74 to emit a signal that communicates with the passive RFID tag on the cell phone in order to find the location of the cell phone. Alternatively, if the cell phone has a battery charge but is simply turned off, the owner 72 may use the reader 74 to instruct the RFID tag thereon to activate the cell phone. A powered cell phone may then be located by GPS, for example. Lastly, incorporation of passive RFID tags with the products 76 also provides the ability of creating a manifest list of the products 76 within the home 78. Such a list may include the name, model number, unique identification number, picture, location, quantity, etc. In this respect, the above embodiments may be particularly useful for use with an inventory control system.

Another security feature that may be integrated with the anti-identity theft and information security system is facial recognition software. For example, the systems, methods and software described with respect to U.S. Patent Application Publication No. 2010/0172550 (U.S. Ser. No. 12/436,069) and U.S. Patent Application Publication No. 2010/0172551 (U.S. Ser. No. 12/567,541), the contents of both publications being herein incorporated by reference, may be used to identify or correlate the facial features of a particular user with the facial features of pictures in a database. This feature may be particularly useful, for example, in further verifying the identity of the person trying to authenticate a passport, credit card, reader, or other device within the scope of this disclosure. The facial recognition software provides an additional means for enhancing the safety and security of information stored in the RFID tags pursuant to requiring positive biometric identification.

For instance, the facial recognition software may be particularly useful to further verify the identity of a passport holder at a customs checkpoint. A camera at the customs checkpoint may take the picture of the person holding the passport. Passport information such as the picture of the passport holder, which may be visible on the passport itself or simply securely stored on the RFID tag, is retrievable from a government database. The picture taken of the person holding the passport at the customs checkpoint is cross-referenced with other photographs stored in the government database. The information that is of particular interest is whether the picture taken at customs matches the picture that correlates to the passport presented by the passport holder. The facial recognition and correlation software would use various facial features, as described in detail in the '550 and '551 Publications, to ascertain whether the identity of the passport holder matches the identity of the passport picture stored in the government database. The facial recognition and correlation software may also check or cross-reference the picture taken at customs with other similar passport pictures in the government database to positively identify the passport holder.

Furthermore, the facial recognition software described above could be used with the systems, methods and software described with respect to U.S. Patent Application Publication No. 2010/0207721 (U.S. Ser. No. 12/389,106), the contents of which are herein incorporated by reference, as a means for identifying unauthorized users of an electronic device—such as those that may endeavor to access information from the RFID tag described above. This feature further enhances the security of the information on the RFID tag because it provides an additional layer of user authentication—i.e., facial features. This feature may also be particularly preferred for use at a customs checkpoint where it may be desirable to quickly identify whether the biometric features of the passport holder (e.g., thumbprint, iris and facial features) all match the biometric identification information used in association with the RFID chip in the passport. Of course, the facial recognition software can be utilized in any of the authentication procedures described with respect to any of the embodiments above.

Furthermore, the anti-identity theft and information security system described herein can require certain access and transmission authentication requirements in order for users to access certain information stored in association with an electronic device. For example, a portable electronic device capable of transmitting, receiving, accessing and/or storing information, such as the identification card 10, any item with the RFID tag 12 or a comparable transmission tag (e.g., the tags attached to the products 76), the credit card 42 or the Smartphone 46, may require certain credentials before transmitting, receiving, accessing or storing electronic information associated therewith. As is well known in the art, electronic devices such as desktop computers, laptops, netbooks, the Smartphone 46 or other comparable portable electronic devices, etc. have the ability to store information locally, or access information remotely through one or more data networks. For example, information stored on a local drive is generally accessible by simply operating the device (when unsecured), entering a password (e.g., a four digit code on the Smartphone 46) or entering a username and password to access the operating system in general (e.g., a desktop or laptop computer). Using a four digit code or requiring a username and password provides a certain level of security against accessing the device and the information stored thereon. But, a four digit code and/or a username/password are still subject to being hacked by a malicious computer program. Additionally, as mentioned above, identity theft schemes have grown increasingly more sophisticated such that users inadvertently disclose the information to thieves. Accordingly, access to these electronic devices can be secured by requiring biometric authentication by means of the RFID tag 12 and integral receptor 18, the thumbprint scanner 26, the iris scanner 36, the thumbprint reader 48 or the facial recognition technology mentioned above.

In this respect, the security of the information stored on the electronic device may incorporate multi-layer and user-based access restrictions. For example, the Smartphone 46 may include three different security or access settings for information, which may include documents, files, programs, etc., stored or accessible therein. These particular security settings are described below with respect to the Smartphone 46, but a person of ordinary skill in the art will readily recognize that these principles are applicable to other comparable stationary or portable electronic devices known in the art. Preferably, the accessibility of information on the Smartphone 46 depends on the sensitivity of the information and the user. Information assigned a "low security" setting may be generally accessible by any user of the Smartphone 46; information assigned an "intermediate security" setting may only be accessible by providing certain basic authentication information and may only be transmittable over certain secure transmission channels; and information assigned a "high security" setting may require the use of biometric data and higher security data transmission channels, as described in more detail below.

In general, the "low security" setting may not require any sort of authentication to access certain features on the Smartphone 46. Here, the Smartphone 46 may be configured to allow all users to make or receive phone calls, access a maps program, or check the time. Accessing this generic information provides little security risk to the owner of the Smartphone 46. The "intermediate security" setting, however, may restrict certain features of the Smartphone 46 to only those users that know a four digit code or other username/password. In this example, information such as family pictures, contacts, certain programs (e.g., an internet browser or some other "app") may only be accessible by users that supply at least enough access credentials that satisfy "intermediate security" or "high security" authentication requirements. In this respect, the Smartphone 46 may include multiple logins, whereby the owner may regulate access to certain information therein depending on the user. Customized account access of this sort provides a nearly unlimited combination of access privilege assignments depending on the information and/or the user. This feature may be utilized in circumstances where the user provides a unique username/password (for "intermediate security" applications) or biometric information (for "high security" applications). The problem, however, with merely providing a four digit code or a username/password to access "intermediate security" information is that the access credentials can still be obtained by unauthorized users. Accordingly, the "high security" setting is particularly useful for protecting highly sensitive information (e.g., social security numbers, financial documents, programs that access bank accounts, or other "apps" that may be inappropriate for certain users) because only the authorized person can supply the necessary access credentials (i.e., biometric information) to access this information on the Smartphone 46. In this embodiment, only the authorized user can provide the proper authentication information through use of the thumbprint reader 48. Without supplying the thumbprint data, the otherwise authorized user will not be able access certain information or programs that require "high security" permissions.

In a particularly preferred embodiment, the Smartphone 46 is secured with and requires some type of biometric information to gain access to even "low security" information. This way, the owner may protect the Smartphone 46 from all unauthorized users. Another benefit is that the owner may better regulate security access to all information on the Smartphone 46 by user and by the type of information. To streamline account access, the owner may create groups having certain access privileges, then assign certain information the access privilege for that group (rather than assign those privileges individually). Additionally, biometric authentication provides superior access control—i.e., no longer is the Smartphone 46 accessible by an unauthorized user (e.g., through a stolen username/password); and this feature increases user-based content accountability because certain content can only be accessed when the authenticating person is present. In fact, the Smartphone 46 may log user access and use, including improper use (wherein the user may lose access privileges). As such, it is impossible for an unauthorized user to gain access to the highly sensitive information or programs without the authorized user's knowledge because of the biometric requirement. That is, without supplying the fingerprint of the authorized user, for example, there is no way to otherwise access certain information on the device by entering a four digit security code or by entering a username/password. This type of security would eliminate the effectiveness of fraudulent phishing schemes designed to illegally obtain usernames and/or passwords because this security mechanism completely eliminates the need for such credentials. Furthermore, while this security mechanism greatly enhances account security, it also provides an easier way for authorized users to access their accounts because account access is not longer contingent upon remembering long convoluted passwords, passphrases, or questions designed to elicit personal information.

Additionally, the anti-identity theft and information security system includes the ability to regulate the transmission of information based on the aforementioned security classifications. For example, "low security" information may be transmitted freely over unsecured wireless networks (e.g., Wi-Fi, cellular networks, Bluetooth, etc.). Information or programs deemed to have a higher sensitivity (e.g., "intermediate security" or "high security" information), may require that the Smartphone 46 or comparable electronic device not only first authenticate the user, but then use a certain secure data transmission protocol. For example, to transmit data requiring "intermediate security", the information may need to be transmitted over a secure data network and through a transport layer security ("TLS") or a secure socket layer ("SSL") to ensure data integrity and prevent eavesdropping as information travels through the internet. For example, the type of data that may fall into this classification may include the transmission of passwords to access online bank accounts, credit card accounts, or other sensitive financial or medical information. Additionally, "high security" information may require further security precautions, such as restricted data communications through a secure hardwire connection. For example, in an embodiment where the Smartphone 46 is used as a passport, transmission of security information at customs comparable to that shown with respect to FIGS. 3-4 may require that the user create a hard line connection (i.e., a tethered connection) with the customs station before the Smartphone 46 will transmit highly sensitive information (e.g., social security number, birthday, etc.) required to gain access to a country such as the United States. This embodiment provides two highly desirable security features of the anti-identity theft and information security system. First, the passport information stored on the Smartphone 46 is not accessible by anyone other than the owner because biometric information is required to gain access (i.e., without the owner's biometric information, there can be no access). Second, restricted transmission of sensitive information with the Smartphone 46 over a hard line connection means that there is no possibility that a prying person, such as one with the illicit reader 82 (FIG. 12) can pick up stray information. As such, it is impossible for a "hacker" to gain access to any of the "high security" sensitive information stored or transmitted through use of the Smartphone 46. Such data restriction technology has a wide variety of applications in addition to customs, including, for example, medical applications that require the storage and transmission of redundant medical records.

A person of ordinary skill in the art will readily recognize that the above embodiments may be used with various different electronic devices, including desktop computers, laptops and netbooks, or other special purpose portable devices including electronic information, such as RFID-enabled passports.

The principles described above with respect to the anti-identity theft and information security system also has application in online security, and namely email and database security. For example, email and database security systems employ the use of usernames and passwords to gain access to accounts and/or information. But, as mentioned above, usernames/passwords are prone to being hacked by malicious programs or being inadvertently turned over as part of a phishing scheme by a thief. Even the most secure passwords in the industry, as used by Sony and the United States Government, have been accessed by hackers. Thus, no username/password system is totally secure.

However, the anti-identity theft and information security system described herein could be used as a means for enhancing password and database security. For instance, such a security system may include three access levels that include: 1) standard password usage; 2) biometric identification of one physical feature (e.g., fingerprint, iris scan, or facial recognition) for secret clearance; and 3) biometric identification of all three physical features, i.e., fingerprint, iris scan and facial recognition, for top secret clearance. In this respect, a user may have two email addresses: one for standard email (level one clearance), and a second for sensitive email (level two or level three clearance). The U.S. Government (e.g., the military) could issue email addresses for all three levels, with top secret information requiring level three clearance to even access the inbox. For level two and three security clearances, users would be able to access and read email using a home or work computer, or some other portable electronic device (e.g., Smartphone or iPad) that could read the particular required biometric data. For example, every Smartphone or iPad is preferably equipped with a fingerprint reader, as described above. Scanned fingerprint data would effectively regulate and authenticate access to a level two email account. Without providing the necessary biometric data, access would be denied. Level three email account security may require, however, a more secure environment—one where fingerprint, iris scan and facial recognition may take place. For extremely sensitive data, the system may require multi-person biometric authentication (e.g., persons in different cities). To prevent a terrorist attack on a database, for example, those required to access the database would not be able to (a) meet in one room together; (b) travel on the same plane together; or (c) know the other person's name. As a result, the information in the database would not be prone to be exploited because it would be extremely difficult, if not impossible, to obtain all the biometric identification information to match those with proper access.

Although several embodiments have been described in detail for purposes of illustration, various modifications may be made without departing from the scope and spirit of the invention. Accordingly, the invention is not to be limited, except as by the appended claims.

What is claimed is:

1. An anti-identity theft and information security system process, comprising the steps of:
   storing secure information in association with an electronic device having a communication circuit for sending and receiving data;
   reading biometric information with a scanner for use in accessing the secure information;
   authenticating an identity in connection with the biometric information;
   activating an RFID tag coupled to the electronic device by completing an RFID tag circuit keyed to a unique fingerprint, wherein continued completion of the RFID tag circuit with the fingerprint simultaneously activates a swipe strip;
   establishing a line of data communication between the electronic device and a remote device;
   unlocking access to the secure information based on the authenticated identity; and
   transmitting the secure information between the electronic device and the remote device.

2. The process of claim 1, wherein the communication circuit comprises a wireless communication circuit and a wired port.

3. The process of claim 2, including the step of assigning an access level to the secure information, wherein the highest access level requires transmitting through the wired port.

4. The process of claim 1, wherein the electronic device comprises an identification card, a Smartphone, a credit card, or a passport.

5. The process of claim 1, wherein the remote device comprises a credit card or a passport.

6. The process of claim 1, wherein the reading step includes the step of reading a fingerprint, an iris, or a facial feature.

7. The process of claim 6, wherein the authenticating step includes the step of authenticating the fingerprint, the iris and the facial feature before unlocking access to at least some of the secure information.

8. The process of claim 1, including the step of approving an internet transaction using the biometric information, wherein the remote device comprises an internet server.

9. The process of claim 1, including the step of terminating activation of the RFID tag after removal of the fingerprint from the RFID tag circuit.

10. The process of claim 1, including the step of locking the swipe strip when the fingerprint is removed from the RFID tag circuit.

11. The process of claim 1, wherein the scanner is coupled to the electronic device and the establishing step includes the step of matching biometric information from the electronic device with a biometric identity database associated with the remote device.

12. The process of claim 1, including the steps of receiving encrypted biometric data from the remote device and matching the biometric data with a biometric identity database associated with the electronic device.

13. The process of claim 1, including the step of syncing the electronic device with a product carrying the RFID tag.

14. The process of claim 13, including the step of activating or reprogramming the RFID tag.

15. The process of claim 13, including the step of locking the RFID tag with encrypted data, wherein the RFID tag is only responsive to radio frequencies carrying an authentication code generated by supplying the biometric information.

16. The process of claim 13, including the step of assigning a unique identification number to the RFID tag.

17. The process of claim 13, including the steps of cataloging multiple products in a local database and storing location information therewith.

18. The process of claim 17, including the step of locating one of the products via a passive RFID tag when the product is off.

19. The process of claim 13, including the step of operating the power state of the product via the RFID tag.

20. The process of claim 1, including the step of restricting access to the secure information depending on a security clearance of a user providing the biometric information.

21. An anti-identity theft and information security system process, comprising the steps of:
- storing secure information in association with an electronic device having a communication circuit comprising a wireless communication circuit and a wired port for sending and receiving data;
- activating an RFID tag coupled to the electronic device by completing an RFID tag circuit keyed to a unique fingerprint;
- locking a swipe strip on the remote device when the fingerprint is not completing the RFID tag circuit, wherein completion of the RFID tag circuit with the fingerprint simultaneously activates the swipe strip;
- authenticating an identity in connection with the biometric information received by the RFID tag circuit;
- establishing a line of data communication between the electronic device and a remote device;
- unlocking access to the secure information based on the authenticated identity; and
- transmitting the secure information between the electronic device and the remote device.

22. The process of claim 21, wherein the electronic device comprises an identification card, a Smartphone, a credit card, or a passport and the remote device comprises a credit card or a passport.

23. The process of claim 21, including the step of approving an internet transaction using the biometric information with an internet server, wherein the authenticating step includes the step of authenticating the fingerprint, the iris and the facial feature before unlocking access to the secure information.

24. The process of claim 21, including the step of terminating activation of the RFID tag after removal of the fingerprint from the RFID tag circuit.

25. The process of claim 21, wherein the establishing step includes the step of matching biometric information from the electronic device with a biometric identity database associated with the remote device.

* * * * *